Patented Nov. 7, 1922.

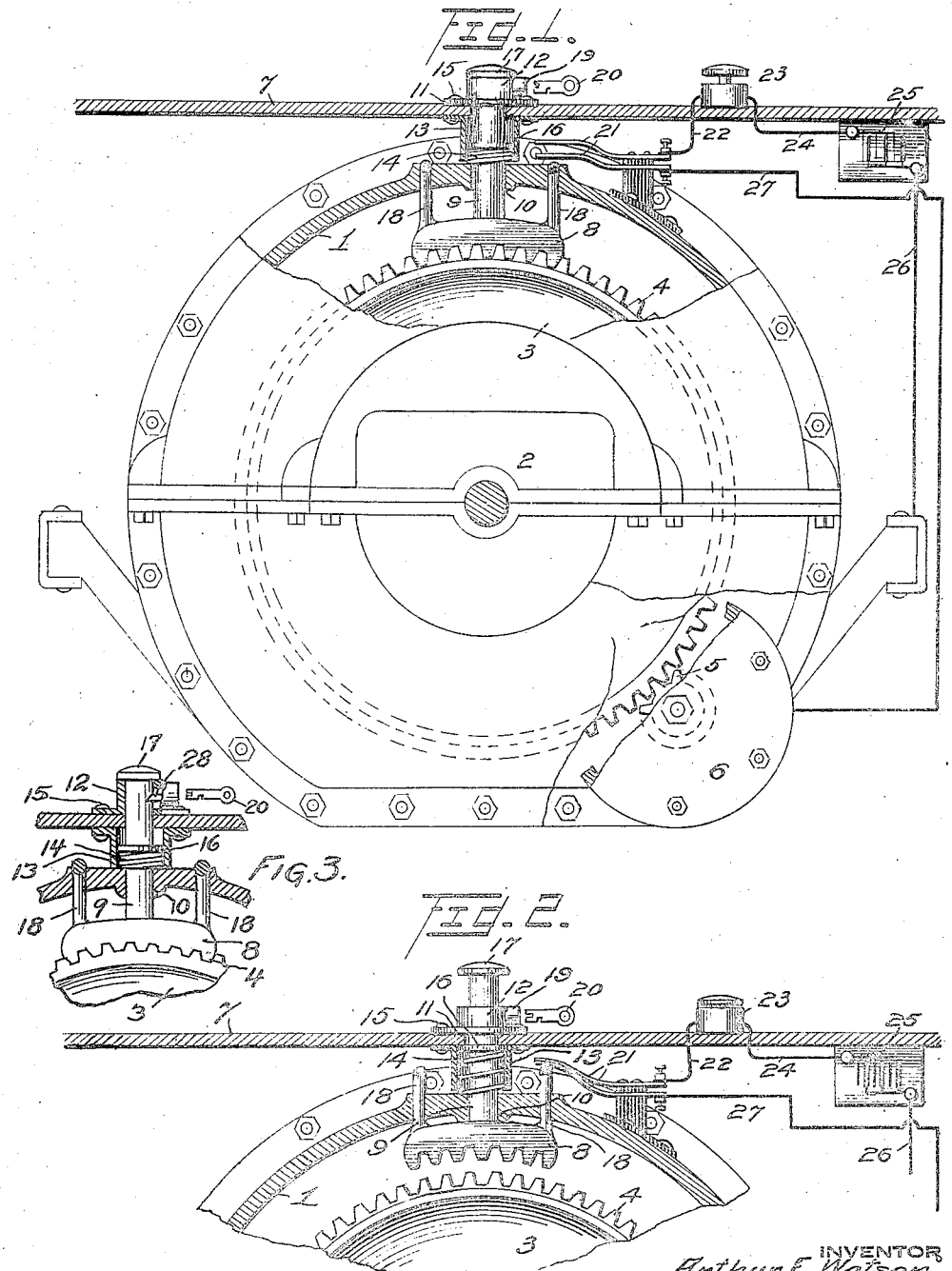

1,434,515

UNITED STATES PATENT OFFICE.

ARTHUR EDWARD WATSON, OF BIRMINGHAM, ALABAMA, ASSIGNOR TO JOHN D. HEAD, OF BIRMINGHAM, ALABAMA.

AUTOMOBILE LOCK.

Application filed February 9, 1920. Serial No. 357,482.

*To all whom it may concern:*

Be it known that I, ARTHUR E. WATSON, a citizen of the United States, residing at Birmingham, in the county of Jefferson and State of Alabama, have invented a new and useful Automobile Lock, of which the following is a specification.

This invention has reference to automobile locks and is designed to provide for the locking of the automobile against being driven under its own power under any circumstances, but at the same time permitting the automobile to be moved from the position in which it may be parked to some other position in case of necessity for such movement as is required by regulations in some localities.

In accordance with the invention, the fly wheel of the automobile engine is positively locked against the possibility of movement, and as such fly wheel and parts to which it is directly connected turn with the engine in driving movements of the latter, the locked fly wheel effectively blocks any attempt at moving the automobile under its own power. However, as the engine when still or when the automobile is not running is disconnected from the drive wheels of the automobile, it follows that the vehicle may be pushed from place to place so that if, in an emergency, the automobile be parked where the movement of the automobile out of the way is essential, the position of the vehicle may be readily changed as circumstances require.

Most automobiles are provided with self-starters and such mechanisms have the fly wheel of the engine equipped with circumferential gear teeth engaged by a pinion on an electric starting motor whereby the starting impulse is applied directly to the engine shaft. It is to automobiles provided with such starting arrangement that the invention is applicable. The invention contemplates the employment of a rack or group of gear teeth constructed to fit the gear teeth on the fly wheel, and such rack, constituting a stop or lock, is mounted to slide toward and from the gear teeth on the fly wheel to mesh with and lock the fly wheel or recede from and release the fly wheel. The rack is positioned to be under the control of an operator, preferably the foot of an operator, and is therefore located at some convenient point and has a stem projecting through the floor of the driver's space. By providing a key or some lock of suitable form, the locking rack may be fastened in the locking position or in both the locking and release positions. In the first position, the starting circuit of the electrical starter is broken, and in the second position it is completed except for the usual starting switch under the control of the operator.

By such an arrangement, an operator may mechanically lock the automoblie by putting the automobile engine completely out of service whether or not a thief endeavors to and succeeds in energizing the starting motor, since the latter cannot then rotate because the engine itself is positively locked against movement. When the operator desires to start the vehicle, the key is properly used, thereby releasing the locking rack which may be constructed to then automatically move away from the gear teeth on the fly wheel, at the same time closing a break in the starting circuit so that the latter may be ultimately completed by the operation of a suitable switch.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 1 is an elevation, partly in section and broken away, of an automobile fly wheel and the engine casing, showing the invention applied with the lock in the closed or locked position.

Fig. 2 is a view similar to Fig. 1, but with the lock open.

Fig. 3 is an elevation, partly in section, of an automobile fly wheel and the engine casing showing my invention applied with the lock in closed or locked position.

Referring to the drawings, there is shown a casing 1 which may be taken as an automobile engine casing. No attempt is made to show any particular automobile engine casing so the showing of the drawings may be considered as typical of any suitable engine casing. There is also shown a cross section of an engine shaft 2 and a partial end view of a fly wheel 3, these parts being common to all or most automobile engines.

The fly wheel 3 is indicated as provided with a circumferential series of gear teeth 4 also very commonly found on automobile engines and designed to be engaged by a pinion 5 carried by a starting motor indicated at 6 in Fig. 1, without any attempt to show any particular type of starting motor. It may, however, be stated that starting motors vary in automobiles and so the showing of the motor 6 may be considered as representing any of a variety of starting motors.

In an automobile, it is customary to have a flooring 7 in the space in front of the driver's or operator's seat, such flooring customarily extending over the engine casing 1 where enclosing the fly wheel 3. In different automobiles, the construction of the engine and of the floor and different operating parts varies considerably and so no attempt is made to show any particular construction of these parts, and therefore the showing may be taken as typical rather than as an accurate representation. Within the casing 1, in operative relation to the gear teeth 4 on the fly wheel 3, there is mounted a rack 8 having its teeth of appropriate size and spacing to match the teeth 4. The rack 8 might, under some circumstances, have but one tooth but is preferably provided with a plurality of teeth, seven being shown in the drawing, but it is to be understood that any number which the constructing engineer may consider advisable may be used. It is customary to place the starting motor 6 rather low down with respect to the engine, wherefore the upper part of the casing 1 where enclosing the fly wheel is usually free from obstruction, thus permitting the location of the rack 8 at a high point immediately over the fly wheel.

In the showing of the drawings, the rack 8 is centrally carried by a stem 9 slidable through a guide or bearing 10 in the top of the casing 1. The stem 9 is continued upwardly through the flooring 7 and through a plate 11 thereon having a boss 12 constituting another bearing for the stem 9. Below the flooring there is secured a sleeve 13 housing a spring 14 coiled about the stem 9, and this housing and the plate 11 may be secured together by rivets 15, or in any other suitable manner. The spring 14 may be so arranged that one end engages against the top of the casing 1 where traversed by the stem 9, while the other end of the spring engages a ring 16 or other stop device fast to the stem 9. In this manner, which may be taken as indicative of any suitable arrangement for the purpose, the stem 9 with the rack 8 has a normal rising tendency and the teeth of the rack 8 have a normal tendency to remain out of mesh with the teeth 4. The upper end of the stem 9 is provided with a head 17 of suitable shape to be engaged by the foot of the operator so that by engaging such head 17 the stem 9 with the rack 8 on its lower end may be pressed downwardly against the lifting action of the spring 14 until the rack engages the fly wheel.

In order to guide the up and down movements of the rack 8, so that it will always move into proper engagement with the teeth 4, the rack 8 carries pins 18 guided through the casing 1 and holding the rack 8 from turning about the axis of the stem 9. Of course, other means may be provided for this purpose which is to maintain the rack 8 in proper relation to the fly wheel to insure proper meshing.

There is also associated with the fly wheel lock a key lock 19 which may be carried by the boss 12. The lock 19 is responsive to a key 20 and operates to hold the rack depressed in mesh with the teeth of the fly wheel, with a bolt 28 of the lock engaging a recess in the stem 9 and thereby preventing outward movement of said stem when the stem is in depressed position. The lock and key may be of the non-pickable type of which there are numerous examples on the market.

In the path of one of the pins 18 are electric contacts 21 so arranged that when the rack 8 is raised the pin 18 engages these contacts and brings them together for the purpose of closing an electric circuit at such place. One of the contacts 21 is connected by a conductor 22 to a switch 23, which may be of the push button or other type, in position to be manipulated by the operator of the vehicle, such push button or switch 23 being shown as mounted on the floor 7. It is to be understood, however, that the switch 23 may be mounted on the instrument board of the vehicle or wherever may be convenient. The other side of the switch 23 is connected by a conductor 24 to one terminal of the usual storage battery 25 employed upon the automobile for energizing the starting motor 6. The other side of the storage battery may be grounded through a conductor 26 while the other terminal 21 is connected by a conductor 27 to the motor 6 in the usual manner, it being understood that one side of the motor 6 may also be grounded.

In the position of the parts shown in Fig. 1, it may be assumed that the operator has locked the vehicle against operation, having depressed the rack 8 into mesh with the gear teeth 4 of the fly wheel 3. This movement has compressed the spring 14 and moved the pin 18 out of engagement with the contacts 21, which are elastic contacts and so mounted as to automatically move apart when not otherwise held. The lock 19 may be of a character which will cause it to automatically lock when the rack 8 is in the locking position, or it may be of a character making it necessary to remove the key 20 or to use the key 20 for the purpose of maintaining the rack 8 in the depressed position. Furthermore, the lock 19 may be of a character requiring the use or removal of the key 20 when the rack 8 is raised.

In the position of the parts shown in Fig. 1 and with the key 20 inaccessible, the intended thief is completely balked so far as driving the automobile under its own power is concerned. Not only is the engine mechanically and inaccessibly locked but the starting motor circuit is broken at a relatively inaccessible point, and if desired, the break in the starting motor circuit may be made quite inaccessible. Even if the contacts 21 could actually be reached, the closing of the starting motor circuit would be ineffective since the engine could not possibly be rotated.

At the same time the vehicle can be moved by hand or pushed from the place of parking for a distance in accordance with the requirements of some municipalities since in the event of a fire the presence of an automobile locked against movement might prove disastrous.

When the fly wheel of the automobile engine is unlocked, the lock 19 may be relocked by the key 20 so as to hold the rack 8 in the elevated position against accidentally falling and jamming the fly wheel and thereby doing material damage. In the position shown in Fig. 2, the parts are ready for the starting of the automobile by the starter, this requiring only the closing of the circuit of the motor 6 at the switch 23, the raising of the rack 8 causing the closing of the circuit of the motor 6 so far as the contacts 21 are concerned.

The rack 8 is effectively protected from contamination by dust and grime from the road by being enclosed in the motor casing and the stem 9 is similarly protected by the bearing 10. The contacts 21 are well protected against contamination, but even if more or less dust and grime reach them, the arrangement of these contacts insures rubbing contact and the keeping clean of the contact surfaces. The sleeve 13 provides a protection against contamination of the stem 9 and the spring 14.

The lock of this invention has the advantage of utilizing a part of the engine already present, that is, the gear teeth on the fly wheel of the engine.

Other locks acting upon the engine have been devised, but such locks are open to various objections, some being forbidden by ordinances or regulations, others being so arranged as to be easily tampered with or even bodily removed, and others being costly to install, but none of these engine locks are susceptible of attachment to the engine with the utilization of parts of the engine already in use and without in any manner affecting the normal use of such parts.

What is claimed is:

1. An automobile lock comprising, in combination, an automobile engine fly wheel provided with a circular series of peripherally located engine-starting gear teeth, a rack segment having gear teeth conforming to those on the engine fly wheel and extending circumferentially of the fly wheel, said segment being movable radially toward and from the gear teeth on the fly wheel to mesh with and release the latter, a stem carrying the rack segment, automatic means associated with the stem and having a normal tendency to disengage the segment from the fly wheel gear teeth, and a lock controllable at will for engaging the stem to hold the rack segment in the meshing position and in opposition to the tendency of the automatic means.

2. An automobile lock comprising, in combination, an automobile fly wheel with a circular series of peripherally located engine-starting gear teeth, a curved rack adapted to the gear teeth of the fly wheel and movable radially toward and from the gear teeth, a radial stem carrying the rack and extending upwardly through the automobile floor, a lock for the stem above and fixed to the floor in the path of the stem, and a spring imparting to the stem a normal tendency to raise the rack to free the fly wheel.

3. An automobile lock comprising, in combination, an automobile fly wheel with a circumferential series of peripherally located engine-starting gear teeth, a curved rack concentric with the gear teeth and movable radially toward and from the gear teeth on the fly wheel, a radial stem carrying the rack and extending upwardly through the automobile floor, a spring surrounding the stem beneath the floor, and a lock above and fixed to the floor in the path of the stem and in a position to be accessible to the operator of the automobile, said spring imparting to the stem a normal tendency to raise the rack to free the fly wheel and the lock being responsive to a key.

4. An automobile lock comprising, in combination, an automobile engine, a fly wheel for the engine having a circumferential series of peripherally located engine-starting gear teeth, a curved rack associated with the fly wheel and movable radially toward and from the gear teeth to mesh with and release them, a radial stem carrying the rack and rising above the floor of the automobile, a housing beneath the floor of the automobile, and traversed by the stem, a coiled spring surrounding the stem within the housing, guides for the rack carried by the latter for preventing turning of the rack on an axis coinciding with the stem, and lock means carried by the housing for engaging the stem to hold the rack in mesh with the gear teeth on the fly wheel against the normal tendency of the spring.

5. An automobile lock comprising, in combination, an automobile engine fly wheel provided with peripheral engine-starting gear teeth, a rack movable toward and from the gear teeth into and out of mesh therewith, a stem carrying the rack and movable radially with respect to the rack and fly wheel, spaced guide pins on the rack for preventing the latter from turning, a lock for holding the rack in mesh with the engine fly wheel gear teeth, and a starting circuit having terminals in the path of one of the guide pins whereby the movement of the rack into engaging relation to the teeth on the fly wheel causes the breaking of the starting circuit.

6. An automobile lock comprising, in combination, an engine fly wheel having radial, peripheral engine-starting gear teeth, a curved rack radially movable with relation to the gear teeth to engage and release them, and provided with guide pins to prevent rotation of the rack about its axis of radial movement, means for causing the radial movement of the rack out of engagement with the gear teeth and accessible above the floor of the automobile, starting-circuit terminals in the path of one of the guide pins, and an accessible switch above the floor of the automobile included in the starting circuit, whereby the engine may be started by the driver of the automobile when the rack is released and the rack may be held in locked position with the starting circuit broken.

7. A combined engine-starting and engine-locking means, comprising an automobile engine fly wheel provided with a circular series of peripherally located engine-starting gear teeth, a starting motor and starting circuit therefor, a curved rack movable radially into and out of mesh with the gear teeth, a lock for holding the rack in a meshing position with relation to the fly wheel, circuit terminals included in the starting circuit and in the path of a part controlled by the rack, and manually operable means for completing the starting circuit only when the circuit terminals are closed by the rack.

In testimony that I claim the foregoing as my own, I have hereto affixed my signature.

ARTHUR EDWARD WATSON.